United States Patent
Peek et al.

(10) Patent No.: US 6,324,642 B1
(45) Date of Patent: Nov. 27, 2001

(54) METHOD AND APPARATUS FOR INCREASING THE DATA RATE OVER A PARALLEL PORT

(75) Inventors: Greg Peek, Hillsboro; Nelson Yaple, Portland; Phil Martin, Banks, all of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/111,661

(22) Filed: Jul. 8, 1998

(51) Int. Cl.[7] .............................. G06F 7/38; G06F 9/00; G06F 9/44; G06F 15/00
(52) U.S. Cl. .............................. 712/227; 712/245; 710/2; 710/35; 710/109; 326/37
(58) Field of Search .............................. 364/200; 714/25; 709/100; 713/324; 710/2, 35, 109; 326/37; 712/227, 245

(56) References Cited

U.S. PATENT DOCUMENTS

| | | | |
|---|---|---|---|
| 4,667,286 | * 5/1987 | Young et al. .......................... 364/200 |
| 5,588,114 | * 12/1996 | Bhatin .............................. 395/183.01 |
| 5,655,135 | * 8/1997 | Sholander et al. .................... 395/427 |
| 5,754,881 | * 5/1998 | Aas ..................................... 395/822 |
| 5,758,188 | * 5/1998 | Applebaum et al. ................. 395/855 |
| 5,867,718 | * 2/1999 | Intrater et al. ................... 395/750.05 |

* cited by examiner

Primary Examiner—Matthew Smith
Assistant Examiner—Jibreel Speight
(74) Attorney, Agent, or Firm—Kenyon & Kenyon

(57) ABSTRACT

A method is presented that may reduce the number of I/O transactions needed to transfer data between a host device and peripheral device over a parallel port. According to one embodiment, only two I/O transactions are needed to transfer a byte of data as opposed to the eight I/O transactions need in the IEEE 1284-1994 standard. During the two I/O transactions (e.g., transferring data from the host device to the peripheral device), the host device places the data on the data signal lines of the parallel port and toggles a signal on one of the control signal lines. In response, the peripheral device reads the data from the parallel port. Additional bytes can be sent by placing the data onto the port and toggling the signal on the same control signal line. Using this method, a data rate of approximately 4 Mega bits per second may be achieved.

27 Claims, 9 Drawing Sheets

| PIN | FOWARD BYTE | REVERSE BYTE | NIBBLE |
|---|---|---|---|
| nSTROBE | RD/nWR | RD/nWR | RD/nWR |
| nAUTOFEED | xDATASTROBE | xDATASTROBE | xCONTROLSTROBE |
| nSELECTIN | nCONTROLSTROBE | nCONTROLSTROBE | xDATASTROBE |
| nINIT | nRESET | nRESET | nRESET |
| BUSY | nWAIT | nWAIT | DATA |
| nACK | nINTR | nINTR | DATA |
| PE | CMD_BUSY | RESERVED | DATA |
| SELECT | DMA READY | DMA READY | DATA |
| nFAULT | nERROR | nERROR | xWAIT |

FIG. 2

METHOD AND APPARATUS FOR INCREASING THE DATA RATE OVER A PARALLEL PORT

BACKGROUND OF THE INVENTION

1. Field of the Invention

The present invention pertains to data transmission between a computer and a peripheral device. More particularly, the present invention pertains to a method for high-speed, bi-directional data communication across a parallel port.

2. Related Art

In the architectures of many personal computers (PCS), a parallel port is provided which allows communication between the personal computer and a peripheral device such as a printer. Communication between the PC and the peripheral device can be done either through a software handshaking protocol or through a hardware handshaking protocol. In a software handshaking protocol, the exchange of data is typically done with the exchange of command, data, and acknowledge messages. For example, for a PC to send a byte of data to a peripheral device may require the following steps:

1. PC checks control signal (or handshake) line to make sure peripheral device is ready for data.
2. PC places data onto data signal lines of the parallel port.
3. PC sets a signal on a control signal line to indicate that the data is on the parallel port.
4. Peripheral device reads data from data signal lines.
5. Peripheral device sets a signal on a control signal line to acknowledge receipt of data.
6. PC reads the acknowledge signal.
7. PC resets signal on the control signal line from step 3, above.
8. Peripheral device resets signal on the control signal line from step 5, above.

Steps 1 through 8 are then repeated for each byte transferred over the parallel port using this protocol.

A hardware handshaking protocol provides the use of control signal lines in conjunction with data signal lines to help streamline the transfer of data over the parallel port. Such a feature became available in 1994 and is presented, for example, as the Extended Capabilities Port (ECP) and Enhanced Parallel Port (EPP) modes of the IEEE (Institute of Electrical and Electronics Engineers, Inc.) std. 1284–1994 (see "IEEE Standard Signaling Method for a Bidirectional Parallel Peripheral Interface for Personal Computers" (IEEE std. 1284–1994, Dec. 2, 1994)). Although virtually all PCS shipped today have built-in support for these hardware handshaking protocols, most are delivered with the capability turned off in the Basic Input/Output System (BIOS) code. Unless the user is sophisticated enough to reconfigure the BIOS code to enable the hardware handshaking protocol, this feature is typically not used. Also, although virtually all PCS are capable of reversing direction of the data lines on the parallel port (i.e., from the peripheral device back to the PC), this capability is typically turned off in the BIOS as well. In those systems, data transfers from the peripheral device to the PC must be communicated over five control signal lines in the parallel port that are always driven from the peripheral device.

Furthermore, a drawback of the software protocols described in the IEEE standard identified above is the amount of time (measured in Input/Output (I/O) transactions) it takes to send a byte of data over the parallel port. Even in a very high speed computer system using a Pentium® processor (Intel Corporation, Santa Clara, California) and a Peripheral Component Interconnect (PCI) bus (Rev. 2.1, PCI Special Interest Group, Hillsboro, Oreg., 1995), I/O transactions are typically conducted with the parallel port every microsecond, at best. Using the protocols described in this IEEE standard, may require the eight I/O transactions described above to send one byte of data over the parallel port. This leads to a maximum transfer rate of approximately 250 Kilobytes per second (KBps), and a typical value between 40 KBps and 100 KBps.

Accordingly, there is a need for a method to improve the data transfer rate over a parallel port for a PC or the like.

SUMMARY OF THE INVENTION

According to an embodiment of the present invention, a system is provided for communicating data over a parallel port comprising. The system includes a host device and a parallel port coupled to the host device and adapted to be coupled to a peripheral device. The parallel port includes at least one data signal line and a first control signal line. The host device is adapted to place data on the data signal line of the parallel port and to toggle a signal on the first control signal line of the parallel port indicating that the data is ready to be read by the peripheral device.

BRIEF DESCRIPTION OF THE DRAWINGS

FIG. 2 is a table which summarizing the pin definitions for the control signal lines of the parallel port according to an embodiment of the present invention.

FIG. 4b is a flow diagram of the forward byte operation shown in FIG. 4a.

FIG. 5b is a flow diagram of the reverse byte operation shown in FIG. 5a.

FIG. 6b is a flow diagram of the reverse nibble operation of FIG. 6a.

DETAILED DESCRIPTION

Figure 1:
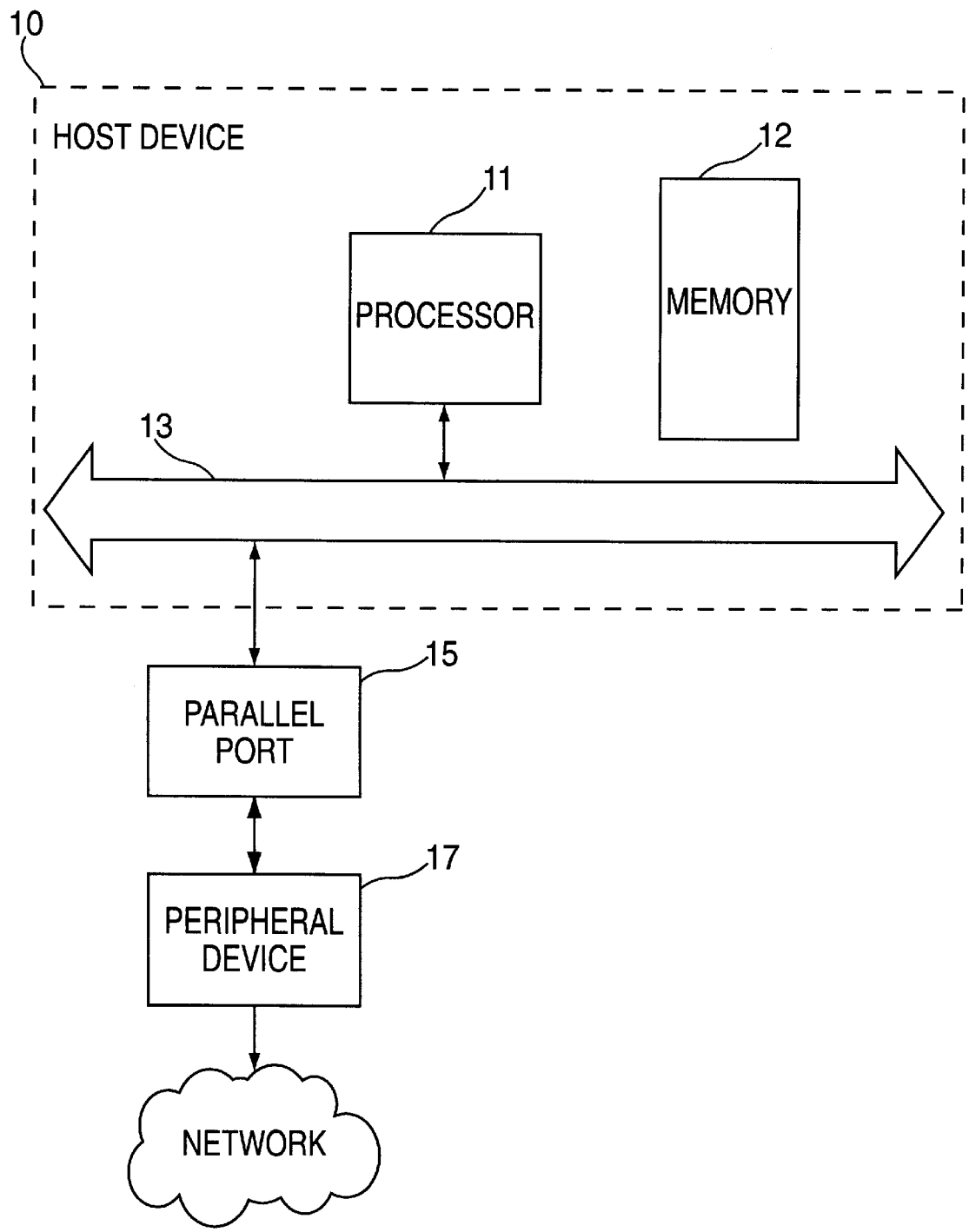
FIG. 1 is a block diagram of a parallel port system according to an embodiment of the present invention.

A simplified block diagram of a computer system including a parallel port is shown in FIG. 1. In this example, host device 10 (e.g., a personal computer) includes a processor 11 (e.g., a Pentium® processor) coupled to a bus 13 (e.g., one operating according to the PCI architecture). Processor 11 is further coupled to a memory 12 (e.g., random access memory—RAM) storing code to be executed by processor 11. In this example, a parallel port 15 is provided coupled to bus 13, but one skilled in the art will appreciate that parallel port 15 can be coupled to an additional bus (e.g., an Industry Standard Architecture (ISA) bus) coupled to bus 13. Parallel port 15 can be coupled to a peripheral device 17 such as a printer. In this example, peripheral device 17 is a network interface component that interfaces between a network 19 (e.g. a local area network—LAN) and parallel port 15.

In operation, parallel port 15 is typically a 25 pin connection that is coupled to a 36 pin connection at peripheral device 17. The definition of each of the pins can be found in the IEEE 1284–1994 standard and can include lines for control, data, address, voltage supply and ground. According to an embodiment of the present invention, nine of the control signals are used to control (and in some cases transfer) data over the parallel port. These signal lines are shown in FIG. 2. The default names (also referred to as the compatible mode names in the IEEE 1284–1994 standard) for each signal line are indicated under the heading "Pin" and corresponding names for a number of transfer modes according to an embodiment of the present invention are shown as well. In this embodiment, active low signals in FIG. 2 are preceded by an "n," and signals which may be active high or low are "half-handshake" signals and are preceded by an "x." The transfer modes include Forward Byte, Reverse Byte, and Nibble and are further described below.

According to an embodiment of the present invention, the host device controls the following control signal lines:

mitting such a command according to an embodiment of the present invention is shown. In this embodiment, the host device places command data on the data signal lines and drives the nControlStrobe control signal line to a low level. In response, the CMD_Busy and nWait control signal lines are activated by the peripheral device to acknowledge that it is reading a command from the data lines (see element 1 in FIG. 3). After the first byte of command data is read, the peripheral device drives the nWait control signal line to a low value to indicate that it is ready for the next byte of command data. The host device then places the second byte of command data on the data signal lines and drives the nControlStrobe control signal line to a low value. Again, the peripheral device drives the nWait signal to a high level in response to the host and drives the nWait signal back to a low level after the second command byte is read. The CMD_Busy control signal line is then driven to a low level, allowing the host device to write a new command if desired (element 2).

In this embodiment of the present invention, the command for setting the transfer mode has a length of two bytes. The first four bits of the first byte determine the command (e.g., 0000 to "select handshake mode" and 1110 to reset the host interface). The last four bits of the first byte indicates

| | |
|---|---|
| Rd/nWr | Read/nWrite - set to a high level (i.e.,"1") when the host device is reading from the peripheral device and set to a low level (i.e.,"0") when the host device is writing to the peripheral device. |
| nDataStrobe | A low level on this signal line indicates that the host is reading or writing a byte of data. |
| xDataStrobe | A transition or edge on this signal line indicates that the host is reading or writing a byte or nibble of data. |
| nControlStrobe | Also known as nAddrstb in the IEEE 1284–1984 standard. A low level on this signal line allows the host device to write data to the control register in the peripheral device's parallel port interface (or reads the status byte if Rd/nWr is at a high level). |
| xControlStrobe | In Nibble mode, a transition or edge on this signal line indicates that the host is reading a nibble of status data. |
| nReset | This signal line allows a hardware reset of the peripheral device if the signal level goes low at any time. |

According to an embodiment of the present invention, the peripheral device controls the following control signal lines:

the transfer mode (e.g., 0000 for nibble mode). In this example, the second byte of the command is the same as the

| | |
|---|---|
| nWait | A handshake signal where a low level signal indicates that it is okay to start an I/O transaction and high level signal indicates that it is okay to end and I/O transaction. |
| xWait | In Nibble mode, a transition or edge indicates a new nibble of data is valid. |
| nIntr | A low level on this signal line sends an interrupt from the peripheral device to the host device controlled by firmware in the peripheral device. |
| CMD_Busy | A low level on this signal line indicates that the peripheral device is ready to receive the first byte of a new command. A high level indicates that the peripheral device has received the first byte and is waiting for the second byte of a command. |
| DMAReady | A high level on this signal line indicates that the hardware is ready to begin high-speed data transfer and is controlled by finnware in the peripheral device. |
| nError | A low level on this signal line indicates that there has been a handshake error detected by the peripheral device, such as an overrun or underrun, or a data transfer in an unexpected direction. |

Figure 3:
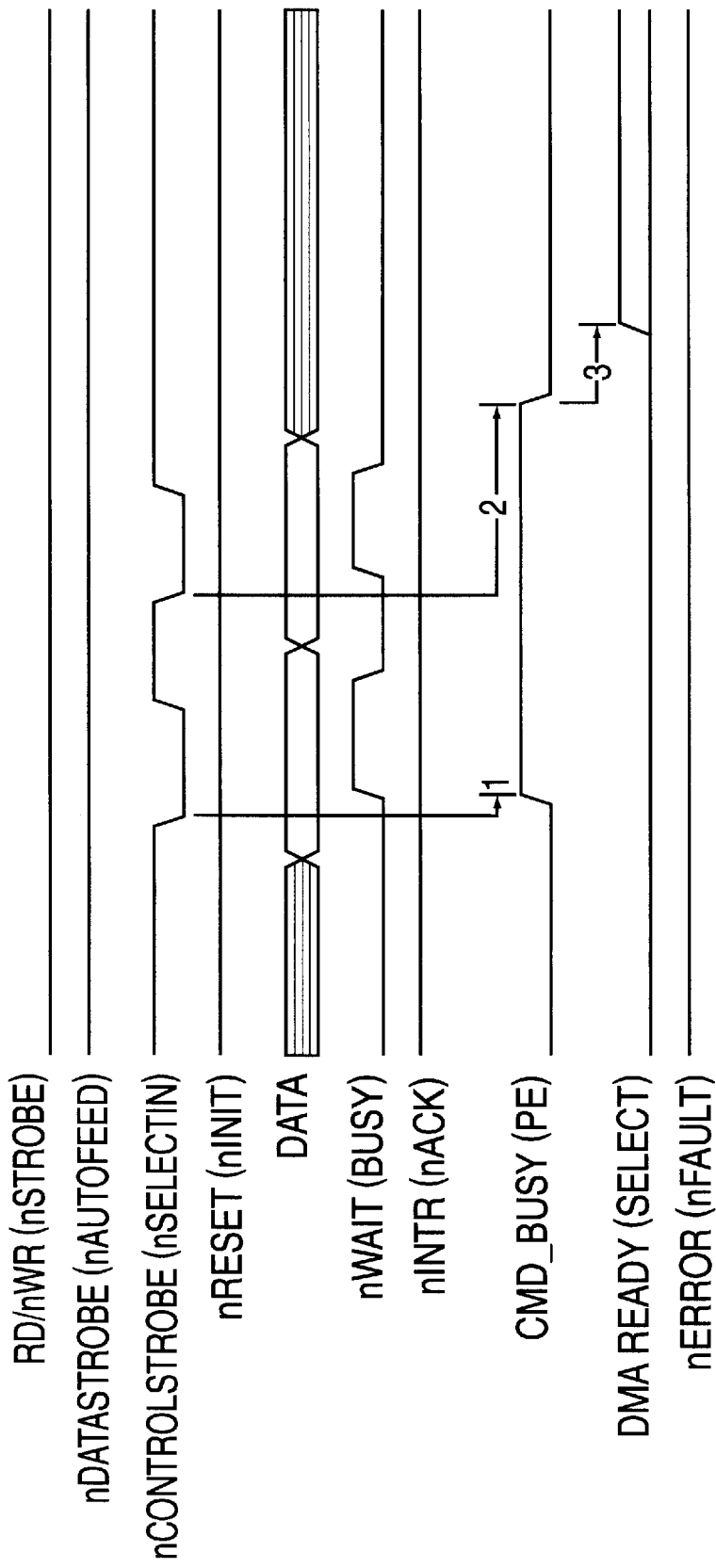
FIG. 3 is a timing diagram for a command transaction over the parallel port according to an embodiment of the present invention.

According to an embodiment of the present invention, the transfer of data in a particular mode (e.g., forward byte, reverse byte, nibble) is set up through an initial I/O transaction where a command (e.g., a two byte command) is transferred from the host device to the peripheral device. Referring to FIG. 3, a timing diagram is shown for transfirst byte. The parallel port can remain in the same transfer mode for a relatively long time. After the transfer mode is set, a second command can be sent in a similar manner where the first four bits of the first byte determine the command (e.g., send, receive, download, reset) and the second four bits of the first byte and the second byte provide twelve bits to communicate the length (e.g., in bytes) of the data packet being transferred over the parallel port. After the peripheral device has processed the commands, it drives the DMAReady control signal line to a high level to indicate that the peripheral device is ready for a high speed data transfer (e.g., in the forward byte, reverse byte, and nibble modes).

If the host device sees an unexpected state on the CMD_Busy line, it will issue a Reset Host Interface command to clear the interface and get back in synchronization (i.e., place all signal lines into a default, initial condition). It may take three bytes written to the command port to get the port back in synchronization because the first byte may be misinterpreted as the second byte of a command (e.g., as a length field).

A forward byte mode refers to one in which a byte of data is transferred from the PC or other host device to the peripheral device over a parallel port. According to an embodiment of the present invention, the forward byte mode uses the handshake signals in a way similar to the EPP mode described in the IEEE 1284–1994 standard, but data is transferred with edges rather than levels. If an odd number of bytes are to be transferred, it may be advantageous for the host device to "pad" the data transferred with an additional byte at the end. This ensures that the handshake lines return to their idle states between block transfers while simplifying transition between forward and reverse transfers and simplifies keeping the host device and the peripheral device synchronized.

During forward byte transfers, according to an embodiment of the present invention, the host device assumes that the peripheral device hardware can keep up with the transfer and does not need to check the status lines. Referring to FIG. 4b, a flow diagram for a forward byte transfer operation is shown. In step 31, a command is transmitted to the data signal lines of the parallel port and a control signal (e.g., nControlStrobe) is set to indicate that the command data is valid (step 33). The command is read by the peripheral device (step 35). In step 37, when the peripheral device has set up its DMA and is ready to accept data, it will set a control signal (e.g., the DMAReady signal line) high. The nWait signal line should be low at that time.

With a first I/O transaction, the host device then writes a data byte (e.g., places a byte of data on eight data lines of the parallel port—step 39) and then with a second I/O transaction toggles the state of the control signal nDataStrobe (step 41). The peripheral device then reads the data on the parallel port (step 43). If more data is to be read (decision block 45) then control passes back to step 39 and the host places the next byte of data on the data signal lines of the parallel port. If the DMA of the peripheral device can reliably keep up, the host device can avoid reading the status of the peripheral device, and only 2 host I/O transactions will be required per byte. This results in a maximum transfer rate of approximately 4 Mega bits per second.

Figure 4A:
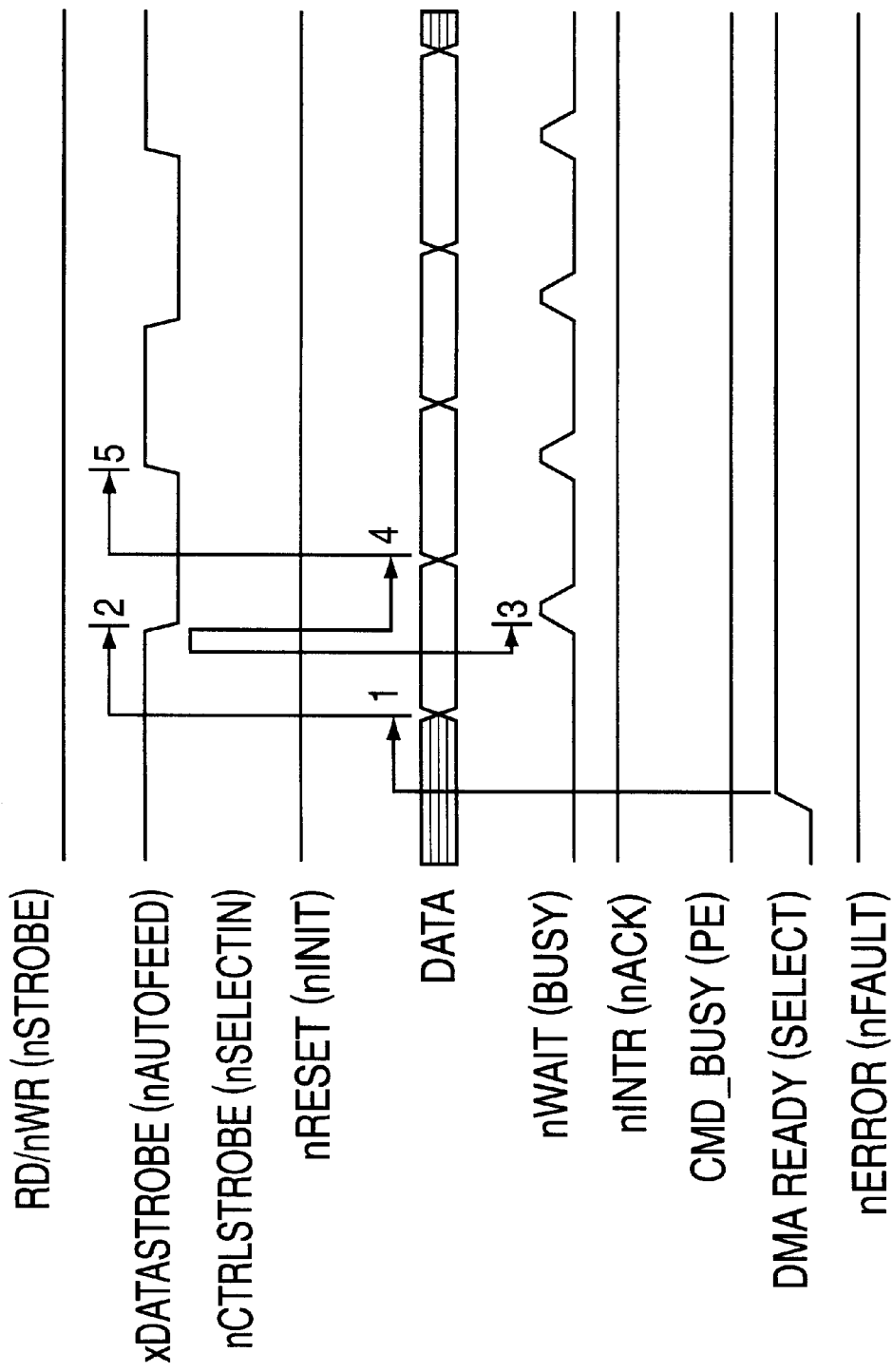
FIG. 4a is a timing diagram for a forward byte operation over the parallel port according to an embodiment of the present invention.
Figure 4B:
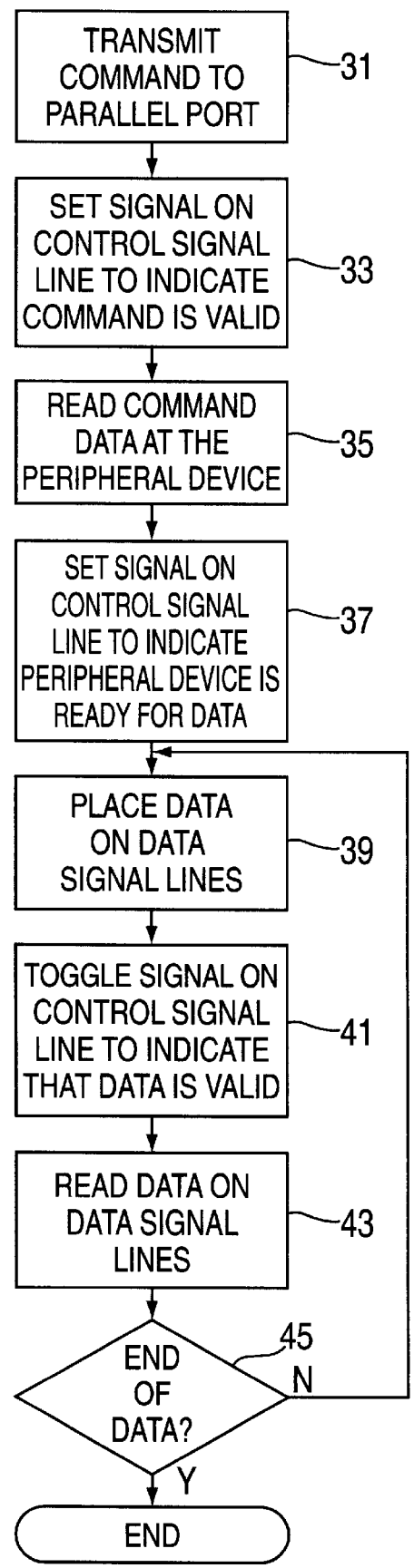

Referring to FIG. 4a, a timing diagram is presented showing the transfer of data in a forward byte mode according to an embodiment of the present invention. The numbers 1–5 have been added to further explain the relationships between the timing of these signals. As stated above, when the peripheral device has set its DMA and is ready to accept data, it sets the DMA Ready signal line high (element 1). Next, the host device writes the first byte, then toggles the control signal xDataStrobe to handshake the data (element 2). In this example, xDataStrobe transitions from a high value to a low value. The peripheral device indicates it has read the byte by setting nWait high (element 3). When the peripheral device is ready for the next byte, it sets nWait low in this example. According to this embodiment of the present invention, the host does not need to monitor the nWait signal line to increase data throughput (i.e., the host device assumes the data has been successfully transferred). The host device then writes the next byte of data onto the data lines of the parallel port (element 4) and toggles xDataStrobe (i.e., transitions this signal to a high value)(element 5). After the peripheral device reads the byte, it drives the nWait signal high and then drives it low when it is ready to receive data, again. The foregoing steps can be repeated for as many steps as are necessary to transfer the intended bytes of data.

During a reverse byte mode, bytes of data are transferred from the peripheral device to the host device over the parallel port. In this embodiment of the present invention, reverse byte transfers are very similar to forward byte transfers. Again, transfers with an odd number of bytes should be padded with an additional byte at the end to ensure that the handshake signal lines are back to an idle condition. In the reverse byte mode, it is assumed that the peripheral device can keep up with the host device software, so the host does not need to check any status lines. Referring to FIG. 5b, a flow diagram for a reverse byte transfer is shown. In this embodiment, the peripheral device indicates that data is to be transferred from the peripheral device to the host device by asserting the control signal nIntr (step 51). The reverse byte transfer can then be initiated by the host device writing a read data command to the parallel port (step 53) and setting the nControlStrobe control signal (step 55). In this embodiment, the length and source of the data transfer are held in the first two or three bytes of the data packet transferred from peripheral to host. The peripheral device then reads the command data (step 57) and sets a control signal (e.g., DMAReady) to indicate that it is ready to send data.

The host device then tri-states the data signal lines (step 59) and sets a control signal (e.g., Rd/nWr) to indicate the tri-state condition of the data signal lines (step 61). The host device then toggles a control signal (e.g., xDataStrobe) indicating that it is ready to receive data (step 63). In response, the peripheral device places data on the data signal lines (step 65) which is read by the host device (step 67). If more data is to be transferred (decision block 69) control passes to step 63 to continue the reverse byte transfer.

Figure 5A:
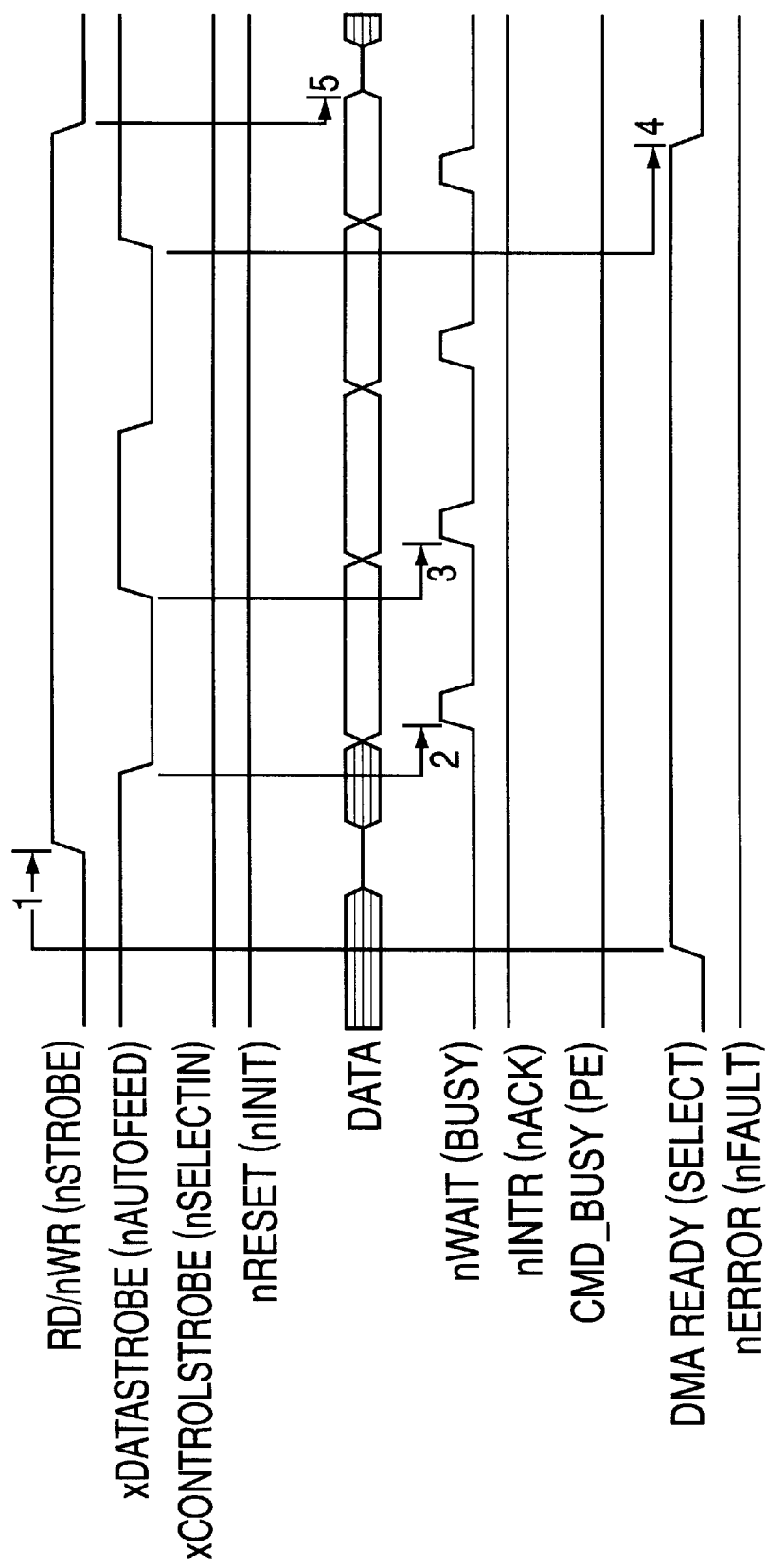
FIG. 5a is a timing diagram for a reverse byte operation over the parallel port according to an embodiment of the present invention.
Figure 5B:
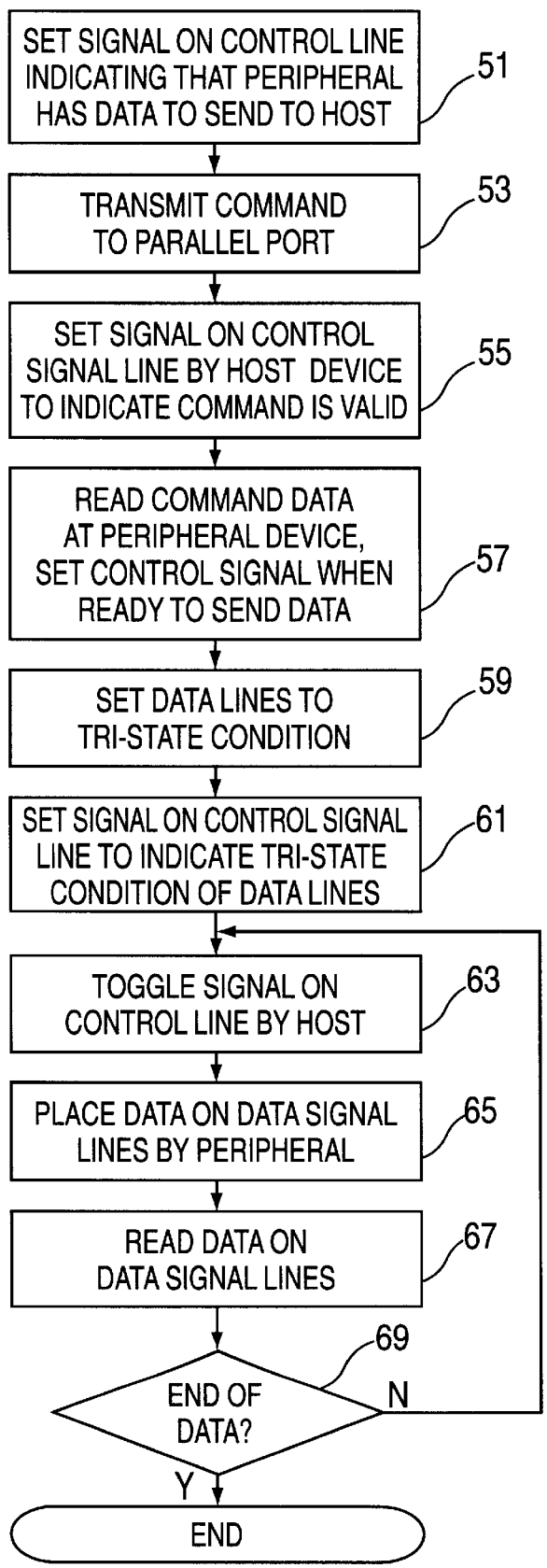

Referring to FIG. 5a, a timing diagram for a reverse byte mode according to an embodiment of the present invention is shown. When the DMA in the peripheral device is ready to transfer data, it will set the DMA Ready signal line high. The host device will then tristate the data signal lines and assert the Rd/nWr signal line (element 1). The host device then toggles the xDataStrobe signal line (e.g., sets it to a low value) which triggers the peripheral device to drive the first data byte onto the data signal lines. After doing so, the peripheral device sets the nWait signal line to a high value (element 2). After the host device reads the data byte, it toggles the xDataStrobe signal line in preparation for receiving the next byte. The peripheral device places the next data byte onto the data signal lines and asserts the nWait control signal line (element 3). Accordingly, each time the host toggles the xDataStrobe control signal, the peripheral device will set nWait low, change the data, then set nWait high. The host device ignores the nWait signal and assumes that the peripheral device is keeping up with the transfer. Therefore, as with the forward byte transfer, only two I/O transactions are required to transfer one byte of data in the reverse byte mode. This gives reverse byte transfers the same speed as forward byte transfers at approximately 4 Mega bits per second. Referring back to FIG. 5a, on the last byte transfer, the peripheral device will set DMA Ready low to indicate there is no more data (element 4). Also, the host devices drives a low signal on the Rd/nWr to force the peripheral device to tristate the data lines.

Figure 6A:
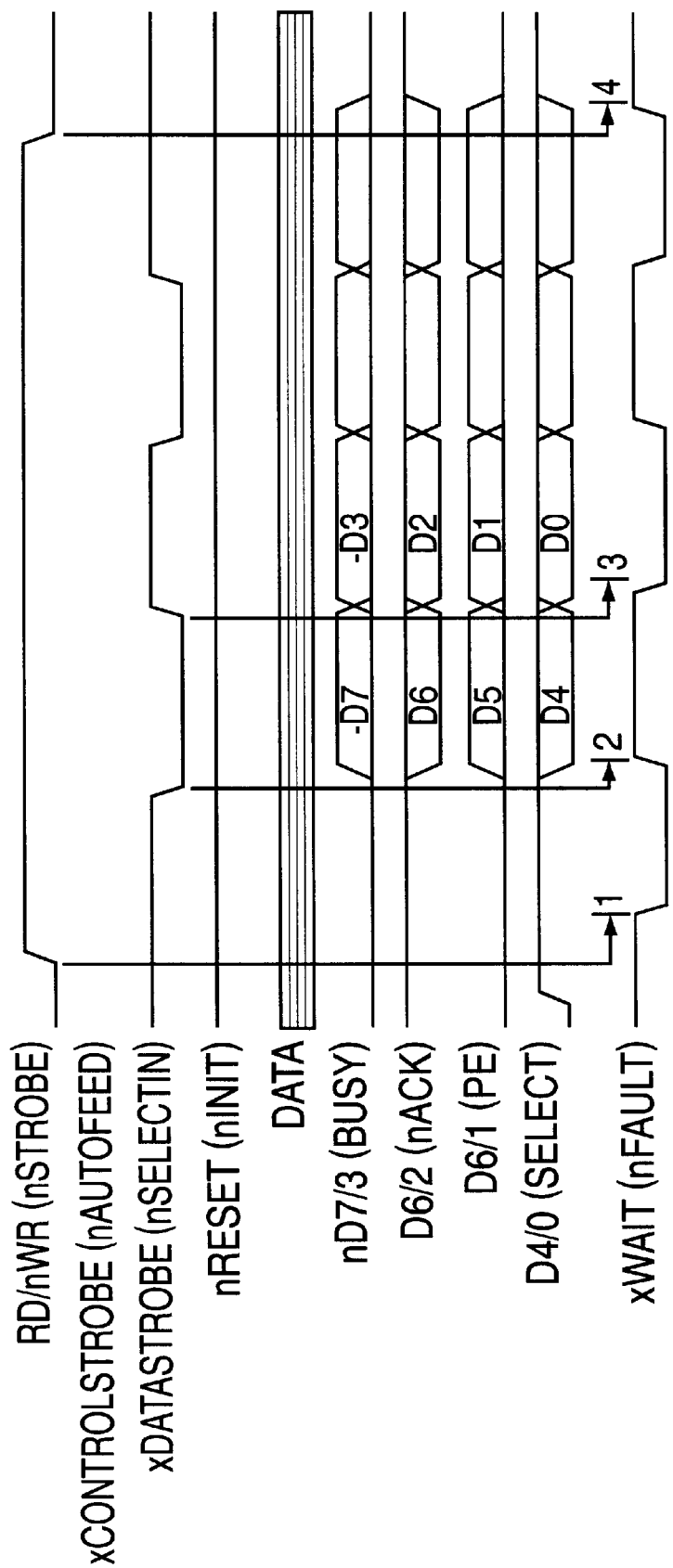
FIG. 6a is a timing diagram for a reverse nibble operation over the parallel port according to an embodiment of the present invention.

During a nibble mode, the peripheral device transfers data over the control signal lines to the host device four bits (i.e., a nibble) at a time. As in EPP mode in the IEEE 1284–1994 standard, the Rd/nWr control signal line controls the switching from forward-byte to reverse-nibble mode. Referring to FIG. 6a, a timing diagram for a reverse nibble mode is shown according to an embodiment of the present invention. When the host device sets the Rd/nWr control signal high, it is requesting the beginning of a block transfer of data from the peripheral device. When the peripheral device has changed the handshake line meanings from a forward mode to a nibble mode, it sets xWait low (element 1). During the data transfer, the host requests a high nibble, in this example (data bits 7-4, D7-4), by setting the xDataStrobe control signal line to a low value. The peripheral device places the high nibble data signals on compatible mode signal lines, Busy, nAck, PE, and Select. After doing so, the peripheral device then sets the xWait signal line to a high value indicating that the high nibble is available on the parallel port (element 2). The host device then requests the low nibble, in this example (data bits 3-0, D3-0), by setting the xDataStrobe signal line to a low value. The peripheral device places the low nibble data signals on the same compatible mode signal lines as with the high nibble and sets the xWait signal line to a low value (element 3). Again, the host device indicates the receipt of the nibble when it toggles the xDataStrobe signal line (e.g., sets it back to a high level). These steps are repeated until the data is transferred. The transfer ends when the host sets the Rd/nWr signal line to a low value and the peripheral device indicates it realizes the nibble mode transfer is over and sets the handshaking signal lines (Busy, nAck, PE, Select, and xWait) to the forward mode values (element 4).

Figure 6B:
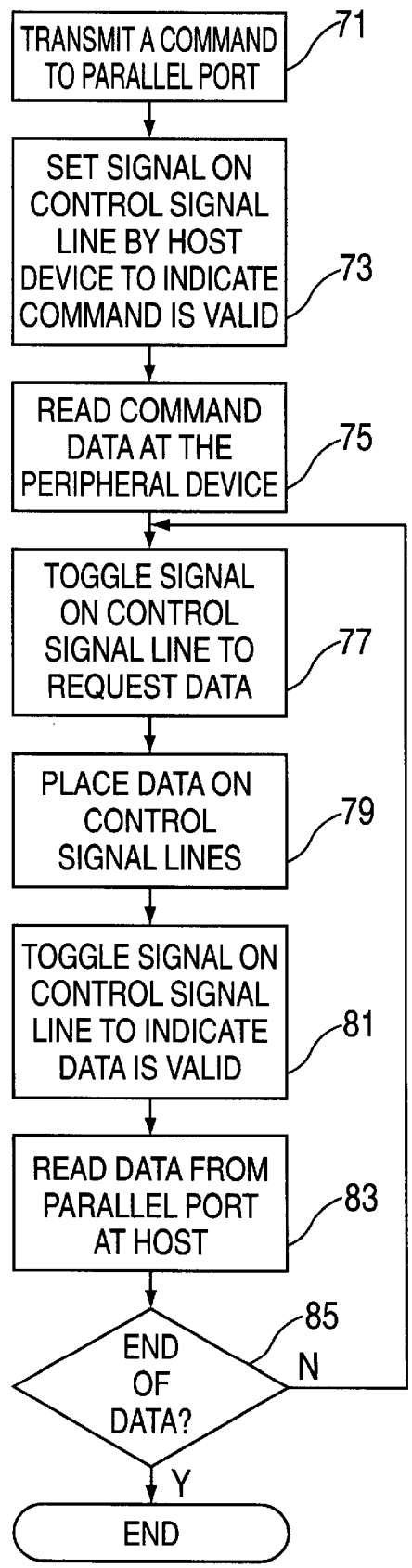

Referring to FIG. 6b, a flow diagram showing the reverse nibble transfer mode of FIG. 6a is shown. In step 71 a command is transmitted to the parallel port. After a control signal is set by the host to indicate the command is valid (step 73), the command is read by the peripheral device (step 75). In the transfer of data, the host device requests data by toggling a control signal (e.g., xDataStrobe—step 77). In response, the peripheral device places valid data onto the control signals of the parallel port (step 79) and toggles a control signal (e.g., xWait—step 81). In step 83, the host device reads the data from the parallel port. If more data is to be sent (decision block 85), then control passes to step 77 so that the host can toggle the xDataStrobe control signal to request more data.

Because nError is used to handshake data in nibble mode, it is difficult to signal an error condition in this mode. If an error is encountered during a nibble mode transfer, the peripheral device will have to hold nError active when the error is recognized until a Reset Interface command is received. Because, in standard personal computer parallel ports, the host device inverts signals placed on the Busy signal line, it would be advantageous if the peripheral device inverts data on this line to save processing resources in the host device. In the nibble mode, a byte of data is transferred with two host I/O read transactions and two host I/O write operations resulting in a transfer rate of approximately 2 Mega bits per second.

Although several embodiments are specifically illustrated and described herein, it will be appreciated that modifications and variations of the present invention are covered by the above teachings and within the purview of the appended claims without departing from the spirit and intended scope of the invention.

What is claimed is:

1. A method for communicating data between a host device and a peripheral device over a parallel port comprising:
   a) placing data on at least one data signal line of the parallel port by the host device;
   b) toggling a signal on a first control signal line from one of a high value to a low value and the low value to the high value by said host device;
   c) reading data from said data signal line by the peripheral device in response to the signal on said control signal line;
   d) toggling the signal on the first control signal line from the other of the high value to the low value and the low value to the high value by said host device; and
   e) reading data from said data signal line by the peripheral device in response to the signal on said control signal line.

2. The method of claim 1 further comprising:
   setting a signal level on a second control signal line of said peripheral port by said peripheral device to indicate that said peripheral device is in a condition to receive data prior to said placing step.

3. The method of claim 2 further comprising:
   transmitting a command to said parallel port prior to said setting step.

4. The method of claim 3 further comprising:
   setting a signal on a third control signal line after said transmitting step; and
   reading said command from said parallel port by said peripheral device.

5. The method of claim 4 further comprising:
   repeating steps a through e for all data to be transferred over said parallel port between said host device and said peripheral device.

6. A method for communicating data between a host device and a peripheral device over a parallel port comprising:
   a) toggling a signal on a first control signal line from one of a high value to a low value and the low value to the high value by said host device;
   b) placing data on at least one data signal line of the parallel port by the peripheral device;
   c) reading said data from said parallel port by the host device;
   d) toggling the signal on the first control signal line from the other of said high value to the low value and the low value to the high value;
   e) reading said data from said parallel port by the host device.

7. The method of claim 6 further comprising:
   setting a signal on a second control signal line by said peripheral device to indicate that the peripheral device has data to transfer to said host device prior to said toggling step.

8. The method of claim 7 further comprising:
   transmitting a command to said parallel port after said setting step.

9. The method of claim 8 further comprising:
   setting a signal on a third control signal line after said transmitting step; and reading said command from said parallel port by said peripheral device.

10. A method for communicating data between a host device and a peripheral device over a parallel port comprising:

setting a signal on a second control signal line by said peripheral device to indicate that the peripheral device has data to transfer to said host device;

transmitting a command to said parallel port;

setting a signal on a third control signal line after said transmitting step;

reading said command from said parallel port by said peripheral device;

toggling a signal on a first control signal line by said host device;

placing data on at least one data signal line of the parallel port by the peripheral device;

reading said data from said parallel port by the host device;

setting said at least one data signal line to a tri-state condition; and setting a signal on a fourth control signal line to indicate to said peripheral device that said at least one data signal line is in a tri-state condition.

11. The method of claim 10 further comprising:

repeating said toggling, placing, and reading steps for all data to be transferred over said parallel port between said host device and said peripheral device.

12. A method for communicating data between a host device and a peripheral device over a parallel port comprising:

a) toggling a signal on a first control signal line by said host device;

b) placing data on at least one control signal line of the parallel port by the peripheral device;

c) toggling a signal on a second control signal line from one of a high value to a low value and the low value to the high value by said peripheral device;

d) reading data from said parallel port by the host device;

e) toggling the signal on the second control signal line from the other of said high value to the low value and the low value to the high value; and f) reading data from said parallel port by the host device.

13. The method of claim 12 further comprising:

transmitting a command to said parallel port prior to said toggling steps.

14. The method of claim 13 further comprising:

setting a signal on a third control signal line after said transmitting step; and reading said command from said parallel port by said peripheral device.

15. The method of claim 14 further comprising:

repeating steps a–f for all data to be transferred over said parallel port between said host device and said peripheral device.

16. The method of claim 15 wherein in said placing step, four bits of data are placed on four control signal lines.

17. A system for communicating data over a parallel port comprising:

a host device; and a parallel port coupled to said host device and adapted to be coupled to a peripheral device, said parallel port including at least one data signal line and a first control signal line;

said host device is adapted to place data on said data signal line of the parallel port and to toggle a signal on said first control signal line of the parallel port from each of a high value to a low value and from the low value to the high value indicating that said data is ready to be read by said peripheral device.

18. The system of claim 17, further comprising:

a peripheral device coupled to said host device via said parallel port wherein said parallel port further includes a second control signal line and said peripheral device is further adapted to set a signal level on the second control signal line of said peripheral port to indicate that said peripheral device is in a condition to receive data prior to said host device placing data on said data signal line.

19. The system of claim 18 wherein said host device is adapted to transmit a command to said parallel port prior to said peripheral device setting the signal level on the second control signal line of said peripheral port.

20. A system for communicating data over a parallel port comprising:

a peripheral device adapted to be coupled to a host device via a parallel port, said peripheral device is adapted to read data from a data signal line of said parallel port after said data is placed on said data signal line and a signal on a first control signal line is toggled by said host device.

21. A system for communicating data over a parallel port comprising:

a host device;

a parallel port coupled to said host device and adapted to be coupled to a peripheral device, said parallel port including at least one data signal line and a first control signal line;

said host device is adapted to toggle a signal on a first control signal line from each of a high value to a low value and from the low value to the high value and is adapted to read data placed on said data signal line of said parallel port by said peripheral device in response to the signal on the first control signal line.

22. The system of claim 21 further comprising a peripheral device coupled to said parallel port wherein said parallel port includes a second control signal line and said peripheral device is adapted to set a signal on said second control signal line to indicate that the peripheral device has data to transfer to said host device.

23. The system of claim 22 wherein said host device is adapted to send a command to said peripheral device after said peripheral device sets the signal on the second control signal line.

24. A system for communicating data over a parallel port comprising:

a peripheral device adapted to be coupled to a host device via a parallel port wherein said peripheral device is further adapted to place data on at least one data signal line of the parallel port in response to a toggling of a signal on a first control signal line of the parallel port from each of a high value to a low value and from the low value to the high value by the host device.

25. A system for communicating data over a parallel port comprising:

a host device; and a parallel port coupled to said host device and adapted to be coupled to a peripheral device, said parallel port including first and second control signal lines;

said host device is adapted to toggle a signal on said first control signal line from each of a high value to a low value and from the low value to the high value and is adapted to read data from the parallel port after data is placed on at least one control signal line and a signal is toggled on the second control signal line by the peripheral device.

26. The system of claim 25 wherein said host device is further adapted to transmit a command to said peripheral device prior to toggling the signal on the first control signal line.

27. A system for communicating data over a parallel port comprising:

a peripheral device adapted to be coupled to a host device via a parallel port, said peripheral device is further adapted to place data on at least one control signal line and toggle a signal on a first control signal line of the parallel port from each of a high value to a low value and from the low value to the high value in response to a toggling of a signal on a second control signal line by the host device.

* * * * *

UNITED STATES PATENT AND TRADEMARK OFFICE
CERTIFICATE OF CORRECTION

PATENT NO.    : 6,324,642 B1
DATED         : November 27, 2001
INVENTOR(S)   : Greg Peek et al.

It is certified that error appears in the above-identified patent and that said Letters Patent is hereby corrected as shown below:

Column 2,
Line 17, "port comprising." should be -- port. --

Column 3,
Line 55, "finnware" should be -- firmware --

Signed and Sealed this

Third Day of September, 2002

Attest:

Attesting Officer

JAMES E. ROGAN
Director of the United States Patent and Trademark Office